No. 700,531. Patented May 20, 1902.
J. C. MILLER.
COOLING AND AERATING DEVICE.
(Application filed Apr. 26, 1901.)
(No Model.)
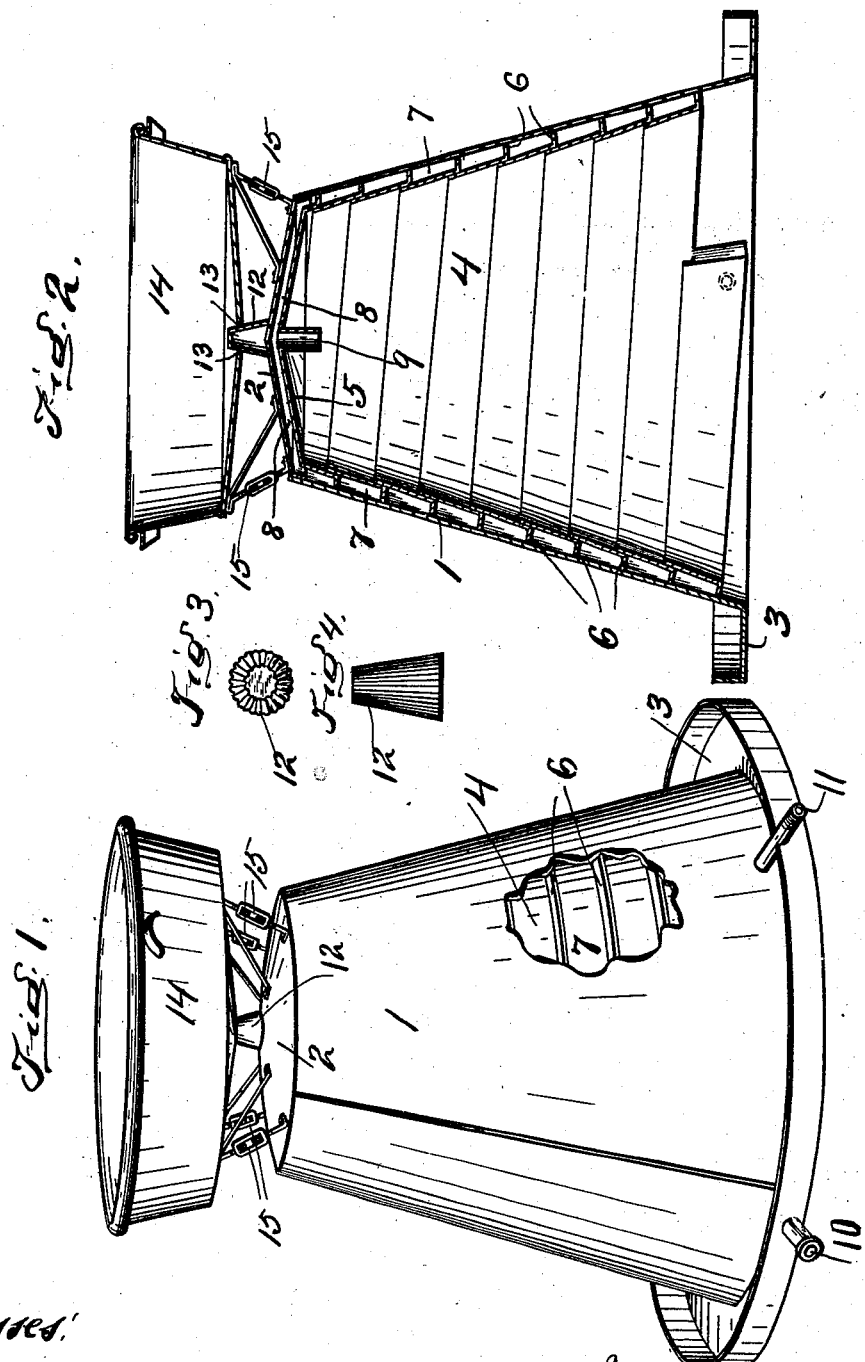
Witnesses:
Inventor
John C. Miller
By Chas. R. Miller

UNITED STATES PATENT OFFICE.

JOHN C. MILLER, OF CANTON, OHIO.

COOLING AND AERATING DEVICE.

SPECIFICATION forming part of Letters Patent No. 700,531, dated May 20, 1902.

Application filed April 26, 1901. Serial No. 57,529. (No model.)

*To all whom it may concern:*

Be it known that I, JOHN C. MILLER, a citizen of the United States, residing at Canton, in the county of Stark and State of Ohio, have invented new and useful Improvements in Cooling and Aerating Devices, of which the following is a specification.

This invention relates to cooling and aerating devices for use in cooling, aerating, and deodorizing milk, and has for its object the production of a simple, convenient, and effective device of this character embodying certain improvements in construction, which will be hereinafter more fully described, and particularly defined in the appended claim.

In the accompanying drawings, forming part of this specification, Figure 1 is a perspective view of a milk-cooler and aerator embodying my invention. Fig. 2 is a central vertical section thereof. Fig. 3 is a top plan view of the corrugated cone. Fig. 4 is a side elevation of the same.

Referring now more particularly to the drawings, the numeral 1 represents a cooling vessel which is in form of a truncated cone and has a fixed inclined top 2 and an annular bottom trough 3. On the interior of this vessel is arranged a frusto-conical spirally-stepped partition 4, consisting of a continuous spirally-wound metallic strip, said partition being closed at its upper end by an inclined top 5 and having exterior spirally-arranged horizontal ribs 6, forming, with the vessel 1 and said partition 4, a spiral or serpentine passage 7, extending from bottom to top of the vessel 1. The inclined tops 2 and 5 of the vessel and partition 4 are spaced apart to form a passage 8, which is in communication with said passage 7, and a tube 9 connects said passage 8 with the interior of the vessel 1.

10 represents a discharge-tube, through which the cooled and aerated milk discharges from the trough 3 into cans or other suitable storage-receptacles, and 11 is an inlet-tube for conducting the cooling-water from a suitable source of supply under pressure to the lower end of the serpentine passage 7.

Secured to the central portion of the inclined top 2 of the vessel 1 is a corrugated cone 12, having its apex directed upward and projecting through a discharge-aperture 13 in the bottom of a superimposed milk-receiving pan or reservoir 14. This pan or reservoir 14 is adjustably mounted on supports having turnbuckles 15, whereby the pan may be adjusted up and down to regulate the flow of the milk through the corrugations of the cone.

The corrugations in the cone 12 are provided not only to form passages for the downward flow of the milk from the pan 14, but also to break up the solid body of milk into a plurality of divided streams and to cause the milk to spread equably in a thin sheet over the entire surface of the inclined top 2, so as to secure rapid and effective cooling.

In using my improved cooler and aerator the vessel 1 is kept cool by a constant supply of cold water, which enters the passage 7 at the bottom through the tube 11 and is forced up under pressure through the various steps spirally until it reaches the top, when it enters the passage 8 and then discharges through the tube 9 into a receptacle of any preferred kind located within or below the vessel 1. The milk passes from the pan or reservoir 14 through the opening 13 and the corrugations of the cone 12, down onto the inclined top 2 of the vessel 1, and thence down over the exterior of said vessel into the trough 3, whence it discharges through the tube 10 into a can or other storage-receptacle arranged to receive it. In flowing down the top 2 and exterior of the vessel 1, which are kept cold by the circulating water, the milk is relieved of its animal heat and aerated, and when it reaches the trough 3 is thoroughly cooled and deodorized. The feed of the milk undergoing the cooling process from the pan or reservoir 14 is controlled by adjusting said pan up or down, which regulates the amount passing through the corrugations of the cone 12.

The invention is simple, cheap, and durable in construction and is adapted to perform its work in an effective manner.

Having thus fully described my invention, what I claim, and desire to secure by Letters Patent, is—

A milk-cooler comprising a frusto-conical wall, an inverted dished top forming a slightly-inclined and comparatively broad supporting and milk-distributing surface, a frusto-conical spirally-stepped partition upon the interior of said vessel and forming a serpentine passage for the circulation of a cooling liquid, an inverted dished partition closing the top of the said partition and forming with the top of the cooling vessel a shallow passage communicating on all sides with said serpentine passage and also forming a comparatively broad and slightly-inclined plane surface for the flow thereover of the cooling liquid, a tube for supplying the cooling medium to the lower end of the spiral passage, a discharge-tube connecting said shallow passage with the interior of the partition, a milk-reservoir having a discharge-orifice, a stationary cone upon the top of the cooling vessel and projecting into said orifice, supports between the reservoir and top of the cooling vessel, and turnbuckles carried by said supports for adjusting the reservoir up and down to vary the position of the cone within said orifice, substantially in the manner set forth.

In testimony whereof I have hereunto set my hand in the presence of two subscribing witnesses.

JOHN C. MILLER.

Witnesses:
CHAS. R. MILLER,
CHAS. M. BALL.